US012659156B2

(12) United States Patent (10) Patent No.: US 12,659,156 B2

Ogawa et al. (45) Date of Patent: Jun. 16, 2026

(54) COMMUNICATION METHOD, COMMUNICATION PROGRAM, AND AUTOMATIC TELLER MACHINE

(71) Applicant: FUJITSU FRONTECH LIMITED, Inagi (JP)

(72) Inventors: Tomoaki Ogawa, Inagi (JP); Yuqing Weng, Inagi (JP); Keita Ishiguro, Inagi (JP); Yasuhiro Morimoto, Inagi (JP)

(73) Assignee: FUJITSU FRONTECH LIMITED, Inagi (JP)

( * ) Notice: Subject to any disclaimer, the term of this patent is extended or adjusted under 35 U.S.C. 154(b) by 15 days.

(21) Appl. No.: 18/767,534

(22) Filed: Jul. 9, 2024

(65) Prior Publication Data

US 2024/0364518 A1 Oct. 31, 2024

Related U.S. Application Data

(63) Continuation of application No. PCT/JP2022/002482, filed on Jan. 24, 2022.

(51) Int. Cl.
 *H04L 9/32* (2006.01)
(52) U.S. Cl.
 CPC ..................................... *H04L 9/32* (2013.01)
(58) Field of Classification Search
 CPC ... H04L 9/32; H04L 9/0838; H04L 2463/062; H04L 2463/102; H04L 9/0897; H04L 63/0442; H04L 63/061; G06F 21/60; G06F 21/85
 See application file for complete search history.

(56) References Cited

U.S. PATENT DOCUMENTS

| | | | |
|---|---|---|---|
| 6,253,997 B1 | 7/2001 | Inaoka et al. | |
| 7,967,193 B1 * | 6/2011 | McGinley | G06F 21/57 |
| | | | 235/379 |
| 8,342,395 B1 * | 1/2013 | Muschellack | G06Q 20/042 |
| | | | 235/379 |
| 2002/0129257 A1 * | 9/2002 | Parmelee | G07F 19/20 |
| | | | 713/180 |
| 2005/0071283 A1 * | 3/2005 | Randle | G06Q 20/12 |
| | | | 705/75 |

(Continued)

FOREIGN PATENT DOCUMENTS

| | | | | |
|---|---|---|---|---|
| CN | 107969001 A * | 4/2018 | ............ | H04W 12/02 |
| JP | 2001-126098 | 5/2001 | | |
| JP | 2019-049770 | 3/2019 | | |

OTHER PUBLICATIONS

Extended European Search Report issued in counterpart European Application No. 22921954.8 dated Feb. 7, 2025.

(Continued)

*Primary Examiner* — Joseph P Hirl
*Assistant Examiner* — Aayush Aryal
(74) *Attorney, Agent, or Firm* — STAAS & HALSEY LLP

(57) ABSTRACT

A communication method includes performing authentication through data communication encrypted by a first encryption scheme by a first processor installed outside a storage box in an automatic teller machine and a second processor installed in the storage box, and transmitting an instruction to the second processor through data communication encrypted by a second encryption scheme, in a case where the authentication has been performed normally by the first processor.

5 Claims, 4 Drawing Sheets

(56) References Cited

U.S. PATENT DOCUMENTS

| | | | | |
|---|---|---|---|---|
| 2005/0240764 | A1* | 10/2005 | Koshy | H04L 9/065 |
| | | | | 713/170 |
| 2010/0116877 | A1* | 5/2010 | Parmelee | G07F 17/42 |
| | | | | 235/379 |
| 2010/0184781 | A1 | 7/2010 | Cho et al. | |
| 2012/0123786 | A1* | 5/2012 | Valin | G06Q 30/02 |
| | | | | 705/26.1 |
| 2013/0317986 | A1* | 11/2013 | Tucker | G06Q 20/1085 |
| | | | | 109/23 |
| 2014/0166744 | A1* | 6/2014 | Crews | G07F 19/211 |
| | | | | 235/379 |
| 2017/0039599 | A1* | 2/2017 | Tunnell | G06Q 20/102 |
| 2019/0140832 | A1* | 5/2019 | Leavy | H04L 9/3247 |
| 2019/0245682 | A1* | 8/2019 | Alwen | H04L 9/3247 |
| 2019/0334712 | A1* | 10/2019 | Whytock | G07F 19/211 |
| 2019/0356649 | A1* | 11/2019 | Alwen | H04L 9/0861 |
| 2019/0356650 | A1* | 11/2019 | Leavy | H04L 63/06 |
| 2020/0184781 | A1* | 6/2020 | Vankirk | G07F 19/202 |
| 2023/0010257 | A1* | 1/2023 | Chauhan | H04L 9/0866 |
| 2023/0012424 | A1* | 1/2023 | Chauhan | H04L 12/1845 |

OTHER PUBLICATIONS

Hisao Ogata et al., "Proposal of a Measure for Controlled Devices to Verify Authenticity of Control Commands", Proceedings of 2019 Symposium on Cryptography and Information Security, Jan. 15, 2019*+.

International Search Report issued in International Application No. PCT/JP2022/002482 dated Apr. 5, 2022.

Written Opinion issued in International Application No. PCT/JP2022/002482 dated Apr. 5, 2022.

* cited by examiner

FIG.4

ATM CONTROL
UNIT
4

C1

BILL CONVEYANCE UNIT
CONTROL UNIT
15

CPU
151

FPGA
153

C3

C2

CASSETTE CONTROL
UNIT
25

FPGA
253

CPU
251

COMMUNICATION METHOD, COMMUNICATION PROGRAM, AND AUTOMATIC TELLER MACHINE

CROSS-REFERENCE TO RELATED APPLICATION

This application is a continuation application of International Application PCT/JP2022/002482, filed on Jan. 24, 2022 and designating the U.S., the entire contents of which are incorporated herein by reference.

FIELD

Embodiments of the present invention relate to a communication method, a communication program, and an automatic teller machine.

BACKGROUND

An automatic teller machine (ATM) conventionally used in transactions at a financial institution, for example, includes plural units, such as a bill conveyance unit that conveys bills for a deposit or a withdrawal and a bill recycle unit (BRU) that stores bills that have been conveyed by the bill conveyance unit and dispenses, on the basis of a withdrawal instruction, bills via the bill conveyance unit. In a known conventional technique for communication between these units in the automatic teller machine, fraudulent manipulations, such as withdrawals using fraudulent commands, are prevented by cryptographic communication of withdrawal commands, for example.

Patent Document 1: Japanese Laid-open Patent Publication No. 2019-049770

However, the above mentioned conventional technique has a problem that preventing a fraudulent manipulation, such as a withdrawal using a fraudulent command, is difficult if cryptographic communication of a withdrawal command is deciphered by hacking, for example.

SUMMARY

According to an aspect of the embodiments, a communication method includes: performing authentication through data communication encrypted by a first encryption scheme by a first processor installed outside a storage box in an automatic teller machine and a second processor installed in the storage box; and transmitting an instruction to the second processor through data communication encrypted by a second encryption scheme, in a case where the authentication has been performed normally by the first processor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an outline of communication between control units.

DESCRIPTION OF EMBODIMENTS

Communication methods, communication programs, and automatic teller machines, according to embodiments will hereinafter be described by reference to the drawings. For the embodiments, the same reference sign will be assigned to components having the same function and redundant description thereof will be omitted. The communication methods, the communication programs, and the automatic teller machines described with respect to the following embodiments are just examples and are not to limit the embodiments. Furthermore, the following embodiments may be combined with one another as appropriate so long as no contradiction is caused by the combination.

Figure 1:
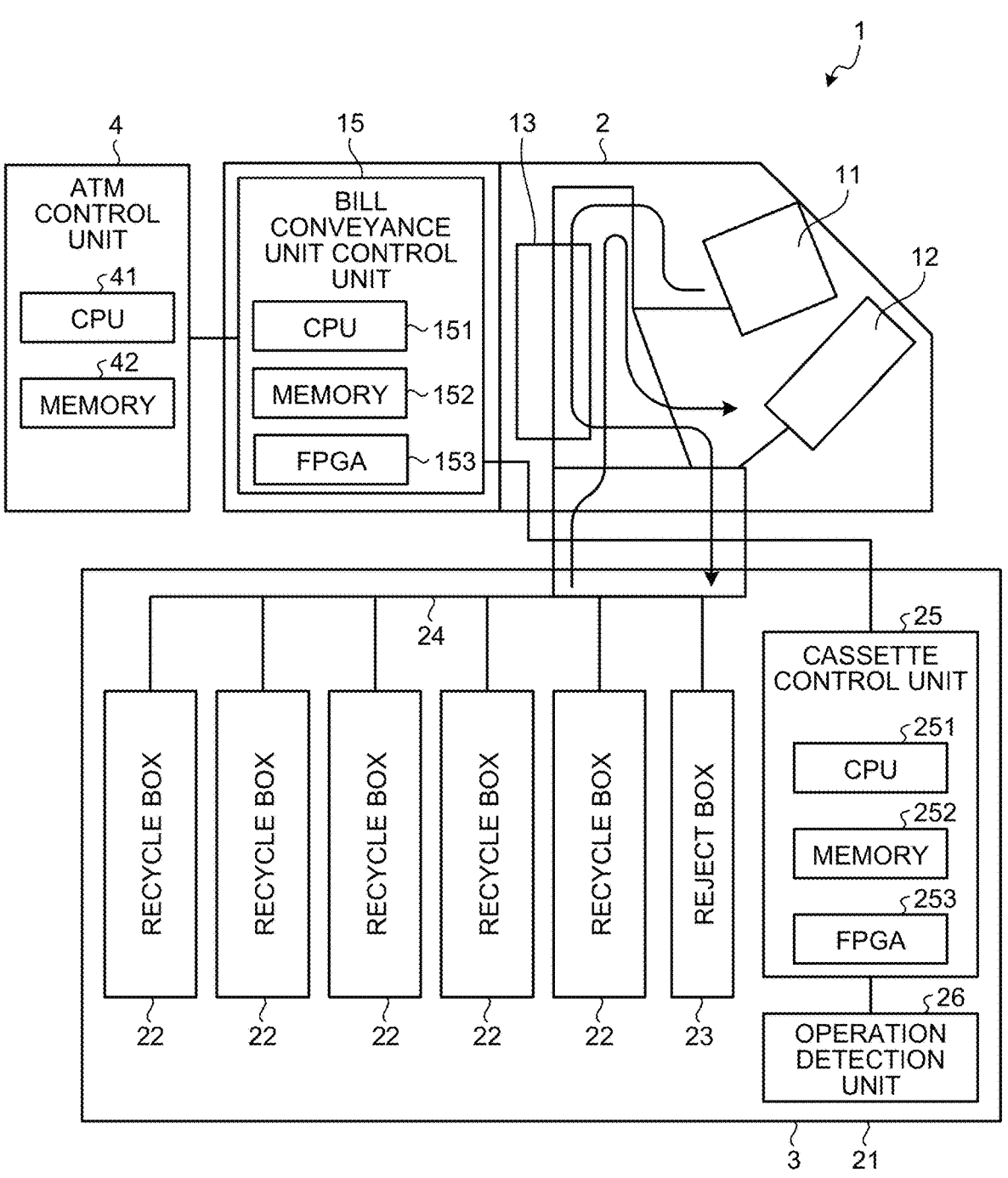
FIG. 1 is a block diagram illustrating an example of a configuration of an automatic teller machine according to an embodiment.

FIG. 1 is a block diagram illustrating an example of a configuration of an automatic teller machine according to an embodiment. As illustrated in FIG. 1, an automatic teller machine 1 has a bill conveyance unit 2, a safe 3, and an ATM control unit 4.

The bill conveyance unit 2 processes deposits and withdrawals of bills according to bill deposit and withdrawal transaction operation by users. The safe 3 is a storage box detachably attached to the bill conveyance unit 2 and capable of storing bills, for example. The ATM control unit 4 controls various type of processing in the automatic teller machine 1.

The bill conveyance unit 2 has a deposit slot 11, a withdrawal slot 12, a distinguishing unit 13, a conveyance path 14, a bill conveyance unit control unit 15, and a passage sensor 16.

The deposit slot 11 is an insertion slot for bills, for deposits of bills into the bill conveyance unit 2. The withdrawal slot 12 is a withdrawal slot for bills, for withdrawals of bills from the bill conveyance unit 2. The distinguishing unit 13 has, for example, a sensor that makes a determination of the denomination of a bill that passes through the conveyance path 14 and notifies the bill conveyance unit control unit 15 of a result of the determination.

The conveyance path 14 is a conveyance path for conveyance of bills in bill deposit and withdrawal processes. This conveyance path 14 includes, for example, a conveyance path for conveyance of a bill from the deposit slot 11 to the safe 3 and a conveyance path for conveyance of a bill from the safe 3 to the withdrawal slot 12. In the conveyance path 14, a mechanical driving unit (not illustrated in the drawings) including conveyance rollers and conveyance motors are driven under control by the bill conveyance unit control unit 15, and conveyance of a bill from the deposit slot 11 to the safe 3 or conveyance of a bill from the safe 3 to the withdrawal slot 12 is thereby performed.

The bill conveyance unit control unit 15 controls operation of the bill conveyance unit 2 on the basis of an instruction from the ATM control unit 4. The bill conveyance unit control unit 15 has, for example, a central processing unit (CPU) 151, a memory 152, and a field programmable gate array (FPGA) 153.

The CPU 151 is a processing unit that performs general processing related to operation of the bill conveyance unit 2 by loading a program stored in the memory 152 into an internal memory and executing the program. For example, under control by the ATM control unit 4, the CPU 151 transmits a drive signal to the mechanical driving unit and controls the operation of the bill conveyance unit 2. Furthermore, under control by the ATM control unit 4, the CPU 151 performs communication (which will be described in detail later) with a unit (a bill recycle unit 21 in the illustrated example) in the safe 3.

The memory 152 is, for example, a non-volatile memory. The memory 152 stores a program related to calculation processing by the CPU 151, unique setting information for the bill conveyance unit 2 (for example, unique information, such as a serial number related to the CPU 151), and key information (for example, a private key and a public key) used in communication between units, for example.

The FPGA 153 is a processing unit that performs specific processing (for example, encryption and decryption of data) in the bill conveyance unit 2, under control by the CPU 151. Without being limited to an FPGA, the FPGA 153 may be implemented by a programmable logic device (PLD) of a type, such as an application specific integrated circuit (ASIC) or a complex programmable logic device (CPLD).

The safe 3 is an example of a storage box and has, for example, a door that opens and closes on a front surface of a casing thereof, the door being lockable with an electronic lock, and the safe 3 has the bill recycle unit 21 therein. Therefore, only a user who is able to unlock the opening and closing door of the safe 3 (for example, an administrator who performs management and maintenance of the automatic teller machine 1) is able to access the safe 3, and access to the unit (the bill recycle unit 21 in this embodiment) installed in the safe 3 is restricted.

The bill recycle unit 21 has plural recycle boxes 22, a reject box 23, a conveyance path 24, a cassette control unit 25, and an operation detection unit 26. The recycle boxes 22 are, for example, storage boxes that store conveyed bills by bill denomination. The reject box 23 is a storage box that stores any rejected bill of conveyed bills.

The conveyance path 24 is a conveyance path for conveyance of bills in the bill recycle unit 21. This conveyance path 24 includes, for example, a conveyance path for conveyance of a bill from the bill conveyance unit 2 to the recycle boxes 22 or the reject box 23 and a conveyance path for conveyance of a bill from the reject box 23 to the bill conveyance unit 2. In the conveyance path 24, a mechanical driving unit (not illustrated in the drawings), such as conveyance rollers and conveyance motors, are driven under control by the cassette control unit 25, and conveyance of a bill from the bill conveyance unit 2 to the recycle boxes 22 or the reject box 23 or conveyance of a bill from the reject box 23 to the bill conveyance unit 2 is thereby performed.

On the basis of an instruction from the ATM control unit 4 notified via the bill conveyance unit control unit 15, the cassette control unit 25 controls operation of the bill recycle unit 21. The cassette control unit 25 has, for example, a CPU 251, a memory 252, and an FPGA 253.

The CPU 251 is a processing unit that performs general processing related to operation of the bill recycle unit 21 by loading a program stored in the memory 252 into an internal memory and executing the program. For example, the CPU 251 transmits a drive signal to the mechanical driving unit on the basis of an instruction from the ATM control unit 4 and controls operation of the bill recycle unit 21. Furthermore, the CPU 251 performs communication with the bill conveyance unit control unit 15 (which will be described in detail later).

The memory 252 is, for example, a non-volatile memory. The memory 252 stores a program related to calculation processing by the CPU 251 and key information (for example, a private key and a public key) used in communication between units, for example.

The FPGA 253 is a processing unit that performs specific processing (for example, encryption and decryption of data) in the bill recycle unit 21, under control by the CPU 251. Without being limited to an FPGA, the FPGA 253 may be implemented by a PLC of a type, such as an ASIC or a CPLD.

The operation detection unit 26 is a switch or a sensor installed in the safe 3. The operation detection unit 26 detects physical operation by a user in the safe 3. Examples of this physical operation include operation to draw out the recycle boxes 22 and the reject box 23 and operation to press a specific switch. The operation detection unit 26 notifies the cassette control unit 25 of a result of detection for these kinds of physical operation.

The ATM control unit 4 has, for example, a CPU 41 and a memory 42. The CPU 41 is a processing unit that performs general processing related to operation of the automatic teller machine 1 by loading a program stored in the memory 42 into an internal memory and executing the program. For example, under control by the ATM control unit 4, the CPU 41 transmits a drive signal to the mechanical driving unit and controls the operation of the bill conveyance unit 2. Furthermore, under control by the ATM control unit 4, the CPU 151 performs communication (which will be described in detail later) with a unit (the bill recycle unit 21 in the illustrated example) in the safe 3.

The memory 42 is, for example, a non-volatile memory. The memory 42 stores a program related to calculation processing by the CPU 41, unique setting information (control unit unique information, such as an HDID) on the ATM control unit 4, and key information (for example, a private key and a public key) used in communication with a unit, for example.

Figure 2:
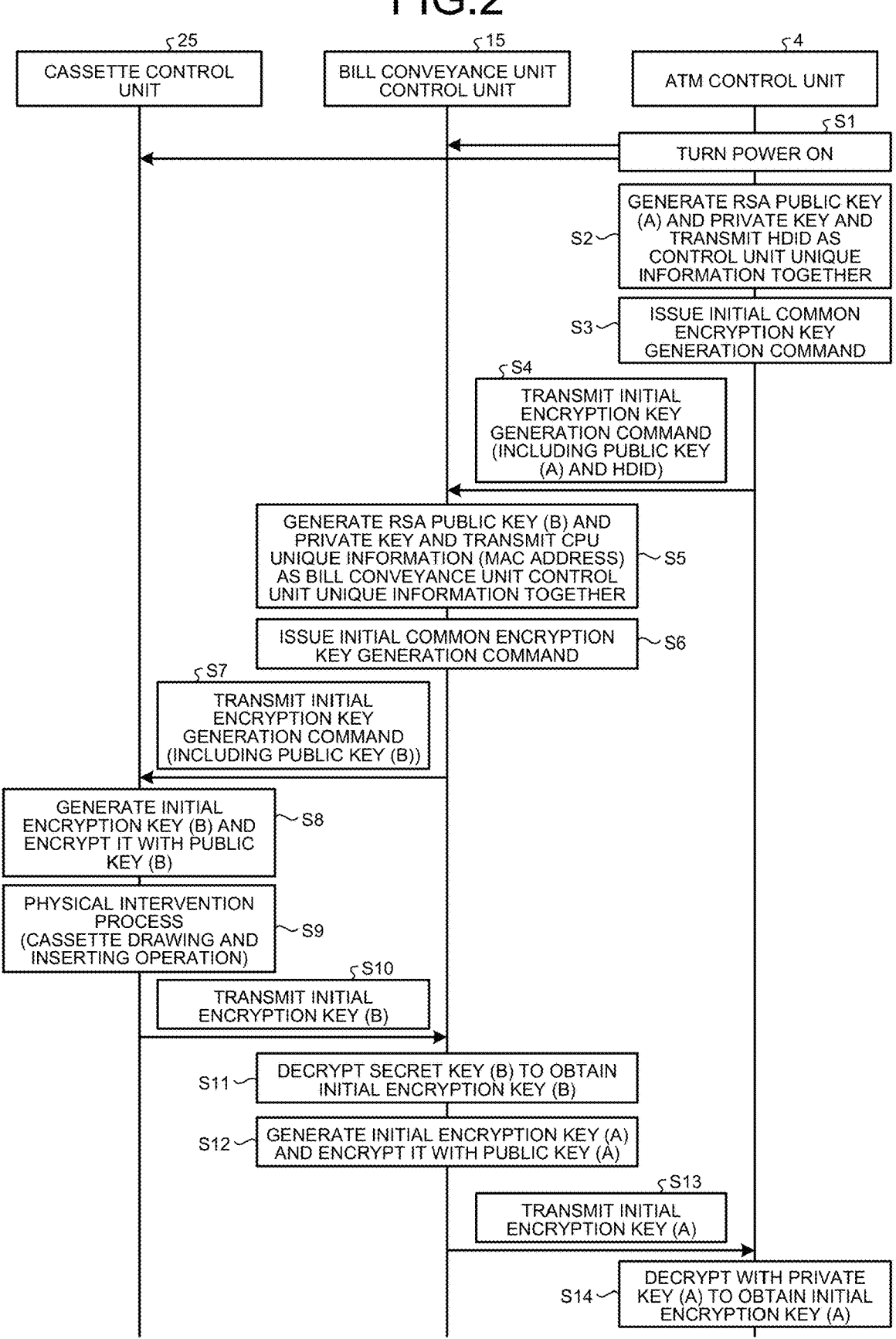
FIG. 2 is a flowchart illustrating an example of operation of the automatic teller machine according to the embodiment.
Figure 3:
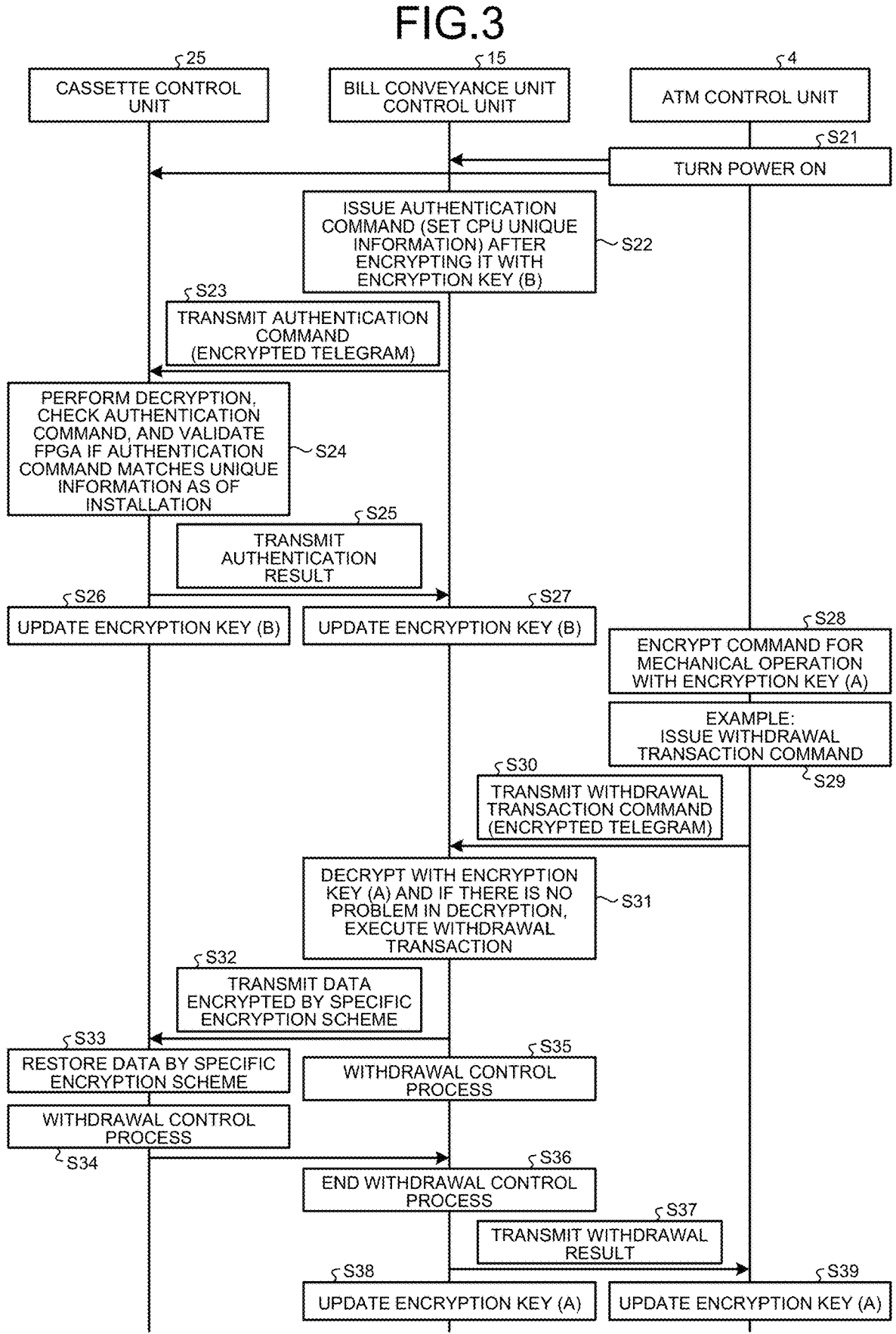
FIG. 3 is a flowchart illustrating an example of operation of the automatic teller machine according to the embodiment.

Operation related to communication between units in the automatic teller machine 1 will be described in detail next by reference to FIG. 2 and FIG. 3. FIG. 2 and FIG. 3 are flowcharts illustrating examples of operation of the automatic teller machine according to the embodiment.

Specifically, FIG. 2 is a flowchart illustrating an example of operation in initial setting related to communication between units upon replacement of a unit, for example. FIG. 3 is a flowchart illustrating an example of operation in communication between units upon a normal boot-up.

The operation in the initial setting related to the communication between the units will be described first. As illustrated in FIG. 2, upon replacement of a unit, for example, power-on (S1) with button operation to instruct the initial setting starts processing for the initial setting in the ATM control unit 4, the bill conveyance unit control unit 15, and the cassette control unit 25.

In response to start of the processing for the initial setting, the CPU 41 of the ATM control unit 4 generates an RSA public key (A) and an RSA private key of a publicly known RSA encryption scheme. Subsequently, the CPU 41 reads an HDID unique to the CPU 41, the HDID having been stored in the memory 42, for example (S2). This HDID is the control unit unique information on the ATM control unit 4 and information transmitted with the RSA public key (A), to the bill conveyance unit control unit 15.

Subsequently, the CPU 41 of the ATM control unit 4 issues an initial common encryption key generation command to instruct setting for performing communication between the bill conveyance unit control unit 15 and the cassette control unit 25 (S3). Subsequently, the CPU 41 of the ATM control unit 4 transmits the issued initial common encryption key generation command including the RSA public key (A) and the HDID, to the bill conveyance unit control unit 15 (S4).

The CPU 151 of the bill conveyance unit control unit 15 that has received the initial common encryption key generation command generates an RSA public key (B) and an RSA private key of the publicly known RSA encryption scheme. Subsequently, the CPU 151 reads CPU unique information (for example, a MAC address) stored in the memory 152, for example (S5). This CPU unique information is unique information on the bill conveyance unit control unit 15 and information transmitted with the RSA public key (B) to the cassette control unit 25.

Subsequently, the CPU 151 of the bill conveyance unit control unit 15 issues an initial common encryption key generation command (S6) and transmits the issued initial common encryption key generation command including the RSA public key (B) and the CPU unique information, to the cassette control unit 25 (S7).

The CPU 251 of the cassette control unit 25 that has received the initial common encryption key generation command generates an initial encryption key (B) and encrypts the generated initial encryption key (B) with the RSA public key (B) (S8). This initial encryption key (B) is, for example, random numbers generated by the CPU 251 from a seed value that is a value detected by a sensor, such as the operation detection unit 26.

Subsequently, the CPU 251 of the cassette control unit 25 checks whether or not there has been any specific physical intervention process in the safe 3 (for example, cassette drawing and inserting operation in the recycle boxes 22 or the reject box 23), on the basis of a result of detection by the operation detection unit 26 (S9).

In a case where the CPU 251 of the cassette control unit 25 has been able to confirm that there has been a specific physical intervention process, the CPU 251 stores the CPU unique information and the initial encryption key (B) notified by the bill conveyance unit control unit 15, into the memory 252. The CPU 251 may directly store the CPU unique information notified by the bill conveyance unit control unit 15, into the memory 252 without checking whether or not there has been any specific physical intervention process. In this embodiment, in a case where a specific physical intervention process in the safe 3, that is, operation in the safe 3 by a user who is allowed to unlock the opening and closing door of the safe 3, has been detected, proper setting processing is assumed to be being performed and storing the CPU unique information into the memory 252 prevents fraudulent setting registration.

Subsequently, the CPU 251 of the cassette control unit 25 transmits the initial encryption key (B) that has been encrypted with the RSA public key (B), to the bill conveyance unit control unit 15 (S10). The CPU 151 of the bill conveyance unit control unit 15 that has received the encrypted initial encryption key (B) decrypts the encrypted initial encryption key (B) with a private key (B) to obtain the initial encryption key (B) (S11) and stores the initial encryption key (B) into the memory 152.

Subsequently, the CPU 151 of the bill conveyance unit control unit 15 generates the initial encryption key (A) and encrypts the generated initial encryption key (A) with the RSA public key (A) (S12). Similarly to the initial encryption key (B), this initial encryption key (A) is, for example, random numbers generated by the CPU 151 from a seed value that is a value detected by a sensor.

Subsequently, the CPU 151 of the bill conveyance unit control unit 15 transmits the initial encryption key (A) that has been encrypted with the RSA public key (A), to the ATM control unit 4 (S13). The CPU 41 of the ATM control unit 4 that has received the encrypted initial encryption key (A) decrypts the encrypted initial encryption key (A) with a private key (A) to obtain the initial encryption key (A) (S14) and stores the initial encryption key (A) into the memory 42.

The operation in the communication between the units upon the above described initial setting will be described next. As illustrated in FIG. 3, normal power-on (S21) starts processing by the ATM control unit 4, the bill conveyance unit control unit 15, and the cassette control unit 25.

After the power-on (S21), the CPU 151 of the bill conveyance unit control unit 15 and the CPU 251 of the cassette control unit 25 perform authentication through data communication of a general-purpose encryption scheme of, for example, the Data Encryption Standard (DES) or the Advanced Encryption Standard (AES) (S22 to S25).

Specifically, the CPU 151 of the bill conveyance unit control unit 15 reads the CPU unique information stored in the memory 152, for example, and generates an authentication command with this CPU unique information set therein. Subsequently, the CPU 151 encrypts the generated authentication command with an encryption key (B) that has been set. This encryption is performed by a preset encryption scheme of general purpose encryption schemes of the DES and AES, for example (S22).

The CPU 151 thereby issues encrypted data for the authentication command having the CPU unique information set therein. Subsequently, the CPU 151 of the bill conveyance unit control unit 15 transmits the authentication command (an encrypted telegram), to the cassette control unit 25 (S23).

The CPU 251 of the cassette control unit 25 that has received the authentication command (the encrypted telegram) decrypts the encrypted telegram with the encryption key (B) that has been set. This decryption is performed by a preset encryption scheme of general purpose encryption schemes of the DES and AES, for example, like that in the bill conveyance unit control unit 15.

Subsequently, the CPU 251 checks the CPU unique information included in the authentication command obtained by the decryption against the CPU unique information stored in the memory 252 by the initial setting to check whether or not these pieces of information match each other (S24).

In a case where the CPU unique information included in the authentication command and the CPU unique information initially set match each other, the CPU 251 authenticates the communication as normal communication and validates the FPGA 253. That is, in the case where the communication is authenticated as normal communication in the cassette control unit 25, encryption and decryption of data using the FPGA 253 become valid.

Furthermore, in a case where the CPU unique information included in the authentication command and the CPU unique information initially set do not match each other and the communication is not authenticated as normal communication, the CPU 251 does not validate the FPGA 253. Encryption and decryption of data using the FPGA 253 thereby become invalid in the case where the communication has not been authenticated as normal communication in the cassette control unit 25.

Furthermore, in a case where the communication is not authenticated as normal communication, the CPU 251 deletes (flushes) the CPU unique information stored in the memory 252 in the initial setting. Even in a case where a fraudulent attempt to arbitrarily set CPU unique information and to repeat authentication is repeated, for example, the fraudulent attempt is thereby able to be prevented from being successful.

Subsequently, the CPU 251 notifies the bill conveyance unit control unit 15 of a result of the authentication (S25). In a case where the notified result of the authentication indicates that the communication has been authenticated as normal communication, the CPU 151 of the bill conveyance unit control unit 15 validates the FPGA 153, similarly to the cassette control unit 25. Encryption and decryption of data using the FPGA 153 thereby become valid also in the bill conveyance unit control unit 15 in a case where the communication has been authenticated as normal communication.

Furthermore, in a case where the result of the authentication indicates that the communication has not been authenticated as normal communication, the CPU 151 does not validate the FPGA 153. Encryption and decryption of data using the FPGA 153 thereby become invalid also in the bill conveyance unit control unit 15 in a case where the communication has not been authenticated as normal communication.

Subsequently, the CPU 251 of the cassette control unit 25 and the CPU 151 of the bill conveyance unit control unit 15 update their encryption key (B) to a new encryption key (S26 and S27).

After the communication is authenticated as normal communication by the above described authentication, an instruction (for example, a withdrawal transaction command for a withdrawal of bills) from the bill conveyance unit control unit 15 to the cassette control unit 25 is transmitted through data communication encrypted by an encryption scheme different from that in the authentication, by using the FPGAs 153 and 253 validated in the authentication (S28 to S33).

Specifically, the CPU 41 of the ATM control unit 4 encrypts a command for mechanical operation related to the bill conveyance unit 2 and the bill recycle unit 21, with an encryption key (A) that has been stored in the memory 42 (S28). This encryption is performed by a preset encryption scheme of general purpose encryption schemes of the DES and AES, for example.

For example, the CPU 41 of the ATM control unit 4 issues a withdrawal transaction command for a withdrawal of bills from the withdrawal slot 12 and encrypts the issued withdrawal transaction command with the encryption key (A) (S29). Subsequently, the CPU 41 of the ATM control unit 4 transmits the withdrawal transaction command (an encrypted telegram) to the bill conveyance unit control unit 15 (S30).

The CPU 151 of the bill conveyance unit control unit 15 that has received the withdrawal transaction command (the encrypted telegram) decrypts the encrypted telegram with the encryption key (A) that has been set. This decryption is performed by a preset encryption scheme of general purpose encryption schemes of the DES and AES, for example, like that in the ATM control unit 4.

In a case where there is no problem in the decryption of the withdrawal transaction command, the CPU 151 of the bill conveyance unit control unit 15 executes a withdrawal control process based on the withdrawal transaction command (S31 and S35). Specifically, by transmitting a drive signal to the mechanical driving unit on the basis of the withdrawal transaction command, the CPU 151 causes bills, which have been conveyed by the bill recycle unit 21, to be dispensed from the withdrawal slot 12 via the conveyance path 14.

Subsequently, the CPU 151 of the bill conveyance unit control unit 15 encrypts the withdrawal transaction command by a specific encryption scheme by using the FPGA 153 that has become valid as a result of the authentication of the communication as normal communication and transmits encrypted data to the cassette control unit 25 (S32).

This specific encryption scheme in the FPGA 153 may be any encryption scheme different from that in the authentication and may be set in any way. Applicable examples of this specific encryption scheme include: an encryption technique involving generation of random numbers using data (for example, time information and information unique to the device) in the automatic teller machine 1; an encryption technique including sharing an encryption key and updating the used encryption key at the same time; and an encryption technique including changing the transmission sequence of communication data after a certain time period.

The CPU 251 of the cassette control unit 25 that has received the data encrypted by the specific encryption scheme performs data restoration (decryption) by a specific encryption scheme by using the FPGA 253 that has become valid as a result of the authentication of the communication as normal communication (S33).

In a case where there is no problem in the data restoration, the CPU 251 of the cassette control unit 25 executes a withdrawal control process based on the withdrawal transaction command restored (S34). Specifically, by transmitting a drive signal to the mechanical driving unit on the basis of the withdrawal transaction command, the CPU 251 causes bills, which have been stored in the reject box 23, to be conveyed to the bill conveyance unit 2 via the conveyance path 24.

Subsequently, the CPU 151 of the bill conveyance unit control unit 15 ends the withdrawal control process by completion of dispensing of the bills to the withdrawal slot 12 (S36), the dispensing corresponding to the withdrawal transaction command, and transmits a withdrawal result indicating the completion of the dispensing, to the ATM control unit 4 (S37).

Subsequently, the CPU 41 of the ATM control unit 4 and the CPU 151 of the bill conveyance unit control unit 15 update their encryption key (A) to a new encryption key (S38 and S39) and ends the process corresponding to the command.

As described above, in the automatic teller machine 1, the bill conveyance unit 2 installed outside the safe 3 in the automatic teller machine 1 and the bill recycle unit 21 installed in the safe 3 perform authentication through data communication encrypted by a first encryption scheme. Furthermore, in a case where the authentication has been normally performed in the automatic teller machine 1, the bill conveyance unit 2 transmits an instruction to the bill recycle unit 21 through data communication encrypted by a second encryption scheme.

Figure 4:
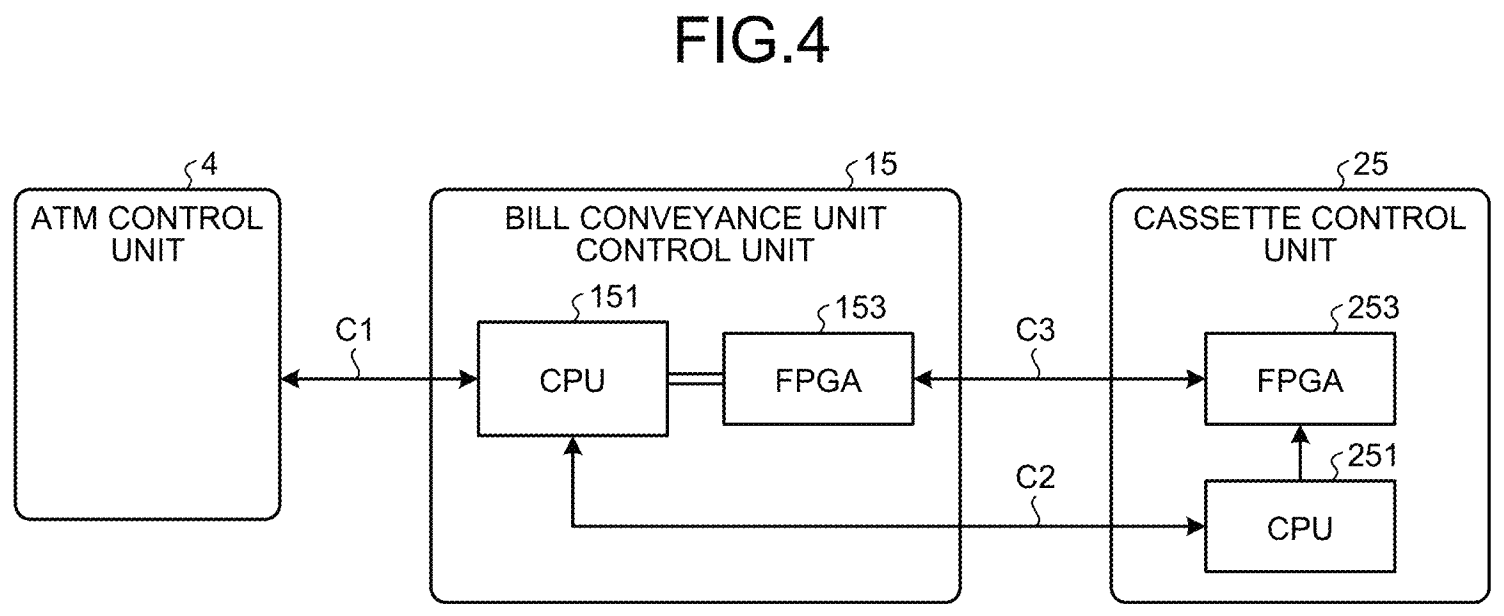

FIG. 4 is a diagram illustrating an outline of communication between control units. As illustrated in FIG. 4, in the automatic teller machine 1, in a case where the bill conveyance unit 2 and the bill recycle unit 21 installed in the safe 3 perform communication according to an instruction C1 (for example, a withdrawal transaction command) from the ATM control unit 4, an authentication command C2 is encrypted by a general-purpose encryption scheme (the first encryption scheme) first and authentication is performed. In a case where this authentication has been normally performed, in the automatic teller machine 1, by use of the FPGAs 153 and 253 in the bill conveyance unit control unit 15 and the cassette control unit 25, data communication C3

(for example, a withdrawal transaction command) is encrypted by an encryption scheme (the second encryption scheme) different from that in the authentication.

As described above, even in a case where communication by the second encryption scheme is deciphered by hacking, for example, performing authentication through data communication of the first encryption scheme different from the second encryption scheme in the automatic teller machine 1 enables prevention of fraudulent operation, such as a withdrawal using a fraudulent command.

Furthermore, in the automatic teller machine 1, a process, in which the bill conveyance unit 2 encrypts set identification information by the first encryption scheme and notifies the bill recycle unit 21 of the identification information and the bill recycle unit 21 stores the notified identification information into the memory 252, is further executed. Upon authentication in the automatic teller machine 1, a notification of identification information is made from the bill conveyance unit 2 to the bill recycle unit 21 by data communication and the bill recycle unit 21 checks the identification information notified against the identification information stored in the memory 252. In the automatic teller machine 1, the identification information on the bill conveyance unit 2 and stored in the memory 252 of the bill recycle unit 21 beforehand thereby enables the authentication to be performed.

Furthermore, in a case where the authentication has not been performed normally in the automatic teller machine 1, the bill recycle unit 21 deletes the identification information stored in the memory 252. Even in a case where a fraudulent attempt to be authenticated is repeated in the automatic teller machine 1, the fraudulent attempt is thereby prevented from being successful.

Furthermore, in the automatic teller machine 1, in a case where the bill recycle unit 21 detects operation in the safe 3 when a notification of identification information is made from the bill conveyance unit 2 to the bill recycle unit 21 upon setting of the identification information, the identification information notified is stored into the memory 252. As described above, setting the identification information by checking authorization for the operation in the safe 3 enables identification information to be prevented from being fraudulently set.

Communication between the bill conveyance unit 2 installed outside the safe 3 and the bill recycle unit 21 installed in the safe 3 has been described as an example with respect to the embodiment, but units performing the communication are not limited to those described above. For example, the communication method in the above described embodiment may be applied to a case where the ATM control unit 4 installed outside the safe 3 and the bill recycle unit 21 installed in the safe 3 directly communicate with each other. Furthermore, a unit installed in the safe 3 is not necessarily the bill recycle unit 21 and may be a coin recycle unit that stores coins and dispenses coins, for example.

Fraudulent manipulations in automatic teller machines are able to be prevented.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication method comprising:
performing authentication through data communication encrypted by a first encryption scheme by a first processor installed outside a storage box in an automatic teller machine and a second processor installed in the storage box;
transmitting an instruction to the second processor through data communication encrypted by a second encryption scheme, in a case where the authentication has been performed normally as a normal communication by the first processor; and
encrypting identification information initially set for the first processor by the first encryption scheme and notifying the second processor of the identification information by the first processor, and storing the identification information notified, into a storage by the second processor, wherein
the performing the authentication includes notifying the second processor of the identification information through the data communication by the first processor and checking the notified identification information against the identification information stored in the storage by the second processor,
in a case where the identification information included in an authentication command and the identification information initially set match each other, the second processor authenticates a communication as the normal communication and validates encryption and decryption of data using a field programmable gate array.

2. The communication method according to claim 1, wherein the performing the authentication includes deleting the identification information stored in the storage, in a case where the authentication has not been performed normally by the second processor.

3. The communication method according to claim 1, wherein the storing includes storing the identification information notified, into the storage, in a case where the second processor detects operation in the storage box when the first processor notifies the second processor of the identification information.

4. A non-transitory computer-readable recording medium storing therein a communication program that causes a computer to execute a process comprising:
performing authentication through data communication encrypted by a first encryption scheme by a first processor installed outside a storage box in an automatic teller machine and a second processor installed in the storage box;
transmitting an instruction to the second processor through data communication encrypted by a second encryption scheme, in a case where the authentication has been performed normally as a normal communication by the first processor; and
encrypting identification information initially set for the first processor by the first encryption scheme and notifying the second processor of the identification information by the first processor, and storing the identification information notified, into a storage by the second processor, wherein
the performing the authentication includes notifying the second processor of the identification information through the data communication by the first processor and checking the notified identification information against the identification information stored in the storage by the second processor, in a case where the identification information included in an authentication command and the identification information initially set match each other, the second processor authenticates a communication as the normal communication and validates encryption and decryption of data using a field programmable gate array.

5. An automatic teller machine comprising:

a first processor installed outside a storage box; and a second processor installed in the storage box, wherein the first processor and the second processor perform authentication through data communication encrypted by a first encryption scheme, and the first processor transmits an instruction to the second processor through data communication encrypted by a second encryption scheme, in a case where the authentication has been performed normally as a normal communication, wherein the first processor encrypts identification information initially set for the first processor by the first encryption scheme and notifying the second processor of the identification information by the first processor, and storing the identification information notified, into a storage by the second processor, the authentication includes notifying the second processor of the identification information through the data communication by the first processor and checking the notified identification information against the identification information stored in the storage by the second processor, and in a case where the identification information included in an authentication command and the identification information initially set match each other, the second processor authenticates a communication as the normal communication and validates encryption and decryption of data using a field programmable gate array.

* * * * *